US008722272B2

(12) United States Patent
Westenberger et al.

(10) Patent No.: US 8,722,272 B2
(45) Date of Patent: May 13, 2014

(54) MODULAR FUEL CELL SYSTEM MODULE FOR CONNECTION TO AN AIRCRAFT FUSELAGE

(75) Inventors: Andreas Westenberger, Buxtehude (DE); Oliver Thomaschweski, Hamburg (DE); Julika Bleil, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 484 days.

(21) Appl. No.: 12/809,715

(22) PCT Filed: Nov. 24, 2008

(86) PCT No.: PCT/EP2008/009945
§ 371 (c)(1),
(2), (4) Date: Aug. 12, 2010

(87) PCT Pub. No.: WO2009/083073
PCT Pub. Date: Jul. 9, 2009

(65) Prior Publication Data
US 2010/0316928 A1     Dec. 16, 2010

Related U.S. Application Data

(60) Provisional application No. 61/015,851, filed on Dec. 21, 2007.

(30) Foreign Application Priority Data

Dec. 21, 2007   (DE) .......................... 10 2007 061 991

(51) Int. Cl.
*H01M 8/02*   (2006.01)
*H01M 8/24*   (2006.01)
*B64C 1/12*   (2006.01)
*B64C 1/16*   (2006.01)
*B64D 35/02*  (2006.01)

(52) U.S. Cl.
USPC ............. 429/462; 429/511; 429/515; 244/54; 244/99.1; 244/119; 244/126

(58) Field of Classification Search
USPC ......... 429/452, 511, 462, 101, 465, 412, 414, 429/471, 505, 515; 244/129.1, 58, 119, 244/126, 54, 99.1; 62/7; 48.2, 50.2; 48/127.9; 417/3
See application file for complete search history.

(56) References Cited

U.S. PATENT DOCUMENTS 2,759,424 A * 8/1956 Defibaugh et al. ................. 417/3
2,777,656 A * 1/1957 Clifton ...................... 244/135 B (Continued)

FOREIGN PATENT DOCUMENTS

DE         69712210       2/1998
DE         19821952      11/1999

(Continued)

OTHER PUBLICATIONS

PCT International Search Report, PCT/IB/304, PCTISA/210, PCT/ISA/237, PCT/IB/306, PCT/IB/308, mailing date of Jan. 1, 2009.

(Continued)

*Primary Examiner* — Kenneth Douyette
(74) *Attorney, Agent, or Firm* — Wood, Herron & Evans, LLP

(57) ABSTRACT

A fuel cell system module for use in an aircraft includes at least one fuel cell system component. The fuel cell system module is connectable modularly to a fuselage section of the aircraft. A housing element of the fuel cell system module is designed to form a section of an outer skin of the aircraft when the fuel cell system module is in the state connected to the fuselage section of the aircraft.

10 Claims, 2 Drawing Sheets

(56) References Cited

U.S. PATENT DOCUMENTS

| | | | |
|---|---|---|---|
| 4,306,693 A | | 12/1981 | Cooper |
| 4,562,123 A | * | 12/1985 | Shimizu et al. ............... 429/462 |
| 6,125,637 A | * | 10/2000 | Bingham et al. ................... 62/7 |
| 6,131,851 A | | 10/2000 | Williams |
| 6,581,874 B2 | | 6/2003 | Lemire et al. |
| 2002/0005454 A1 | * | 1/2002 | MacCready et al. ............... 244/5 |
| 2005/0173591 A1 | * | 8/2005 | Colting ........................... 244/26 |
| 2006/0068247 A1 | * | 3/2006 | Kuwata et al. .................. 429/20 |
| 2006/0237583 A1 | | 10/2006 | Fucke et al. |
| 2006/0251933 A1 | * | 11/2006 | Hoffjann et al. ................. 429/13 |
| 2007/0069078 A1 | * | 3/2007 | Hoffjann et al. ........... 244/129.1 |
| 2007/0090786 A1 | | 4/2007 | McLean |

FOREIGN PATENT DOCUMENTS

| | | | | |
|---|---|---|---|---|
| DE | 102004058430 | | 6/2006 | |
| DE | 102005045130 | | 3/2007 | |
| EP | 1010618 | | 6/2000 | |
| JP | 2000-025696 A | | 1/2000 | |
| JP | 2000-516553 A | | 12/2000 | |
| JP | 2003-530268 A | | 10/2003 | |
| JP | 2005-053353 A | | 3/2005 | |
| JP | 2006-051217 A | | 2/2006 | |
| WO | WO-98/05553 A1 | * | 2/1998 | ............ B64D 27/26 |

OTHER PUBLICATIONS

Niu Michael C.Y., "Airframe Structural Design," Hong Kong: Conmilit Press Ltd, 2nd printing, Jan. 1989, crp. 283, 284. ISBN 962-7128-04-X.
Russian Patent Office, Office Action (4 pgs.).
State Intellectual Property Office of P.R. China, Notification of the First Office Action, Jul. 4, 2012 (3 pgs.).
Notification of Reasons for Refusal, issued by the Japanese Patent Office in corresponding Japanese Patent Application No. 2010-538389, and English-language translation. (4 pages).

* cited by examiner

MODULAR FUEL CELL SYSTEM MODULE FOR CONNECTION TO AN AIRCRAFT FUSELAGE

This application claims priority to PCT Application No. PCT/EP2008/009945 filed on Nov. 24, 2008, which claims priority to U.S. Provisional Patent Application No. 61/015,851 and to German Patent Application No. 102007061991.1, both filed on Dec. 21, 2007.

TECHNICAL FIELD

The present invention relates to a fuel cell system module for use in an aircraft, a set of such fuel cell system modules and an aircraft equipped with such a fuel cell system module.
Background Fuel cell systems enable the generation of electric current with low emissions and high efficiency. Attempts are therefore also being made at present in aeroplane construction to use fuel cell systems to generate the electric power required on board an aeroplane. For example, it is conceivable to replace the generators, currently used for the on-board power supply and driven by the main engines, or the auxiliary power unit (APU) of the aeroplane with a fuel cell system, Moreover, a fuel cell system could also be used for the emergency power supply of the aeroplane and replace the ram air turbine (RAT) used hitherto as the emergency power unit. In the case of a fuel cell system used on board an aeroplane, however, there is the problem that maintenance or repair work on the fuel cell system may possibly lead to long immobilisation times of the aircraft.

The invention is directed to the object to provide a fuel cell system module suitable for use in an aircraft, in particular an aeroplane, which makes it possible to minimize immobilization times of the aircraft due to maintenance or repair work on a fuel cell system provided on board the aircraft and which furthermore is distinguished by a low weight and a small installation space requirement.

SUMMARY OF THE INVENTION

To achieve this object, a fuel cell system module according to the invention for use in an aircraft, which comprises at least one fuel cell system component, is connectable modularly, i.e. exchangeably as a module, to a fuselage section of the aircraft. The fuel cell system module according to the invention can be mounted in a simple, quick and convenient manner on the fuselage section of the aircraft and, if required, detached from the fuselage section of the aircraft again. To carry out maintenance or repair work on the fuel cell system component of the fuel cell system module, the fuel cell system module can therefore be detached from the fuselage section of the aircraft and replaced by another fuel cell system module in a simple manner. As a result, the immobilisation times of the aircraft equipped with the fuel cell system module according to the invention can be minmized.

A housing element of the fuel cell system module according to the invention is designed to form a section of the outer skin of the aircraft when the fuel cell system module is connected to the fuselage section of the aircraft. In other words, the housing element of the fuel cell system module is so configured that it is integrated into the outer skin of the aircraft when the fuel cell system module is mounted on the fuselage section of the aircraft. The housing element provided for integration into the outer skin of the aircraft is preferably so shaped and has such a surface that the aerodynamic properties of the aircraft outer skin are not impaired. By the integration of the housing element of the fuel cell system module according to the invention into the outer skin of the aircraft equipped with the fuel cell system module according to the invention, it is possible to dispense with an additional housing element to be arranged in the interior of the aircraft. The fuel cell system module according to the invention thus enables optimization of the overall system weight. Furthermore, the design of fuel cell system module according to the is invention allows optimum utilization of the installation space available on board the aircraft.

The fuel cell system module according to the invention can comprise as the fuel cell system component a fuel tank, a fuel cell system housing, peripheral components of the fuel cell system and/or a fuel cell. The fuel cell system module according to the invention may comprise only one fuel cell system component, i.e. for example only a fuel tank. Alternatively to this, however, a plurality of fuel cell system components, for example a fuel tank and peripheral components, accommodated in a fuel cell system housing, of the fuel cell system or a fuel cell, may be integrated into the fuel cell system module according to the invention. Furthermore, the integration of a complete fuel cell system into the fuel cell system module according to the invention is also conceivable.

In the case of a preferred embodiment of the fuel cell system module according to the invention, the housing element of the fuel cell system module which is designed to form a section of the outer skin of the aircraft when the fuel cell system module is connected to the fuselage section of the aircraft is formed at least partly by a section of a fuel tank housing. The fuel tank housing serves for holding fuel, i.e. preferably hydrogen in gaseous or liquid form, to be supplied to the fuel cell of the fuel cell system during operation. The storage temperature of liquid hydrogen is approximately $-253°$ C. A section, forming a section of an aircraft outer skin, of a fuel tank housing holding liquid hydrogen does not therefore require a high outlay on insulation to prevent the liquid nitrogen held in the fuel tank housing from freezing when the aircraft is in flight.

In principle, the fuel tank housing of the fuel cell system module according to the invention can be of one-shell design. Preferably, however, the fuel tank housing has an outer shell and an inner shell spaced apart from the outer shell. The outer shell and the inner shell of the fuel tank housing can be composed, for example, of aluminium or steel. In the case of a fuel tank housing of two-shell design, the outer shell of the fuel tank housing is provided for integration into the outer skin of the aircraft equipped with the fuel cell system module according to the invention. If desired, a space between the outer shell and the inner shell of the fuel tank housing can be filled with a material of poor thermal conductivity. Such an insulation layer can shield the inner shell of the fuel tank housing and the fuel held in the fuel tank housing from the possibly greatly varying temperatures in the surroundings of the aircraft.

The fuel tank of the fuel cell system module according to the invention can be designed to store hydrogen gas under elevated pressure. A fuel tank formed as a pressure reservoir has, for example, a fuel tank housing with a carbon-fibre-covered aluminium inner shell and an outer shell of plastic. Furthermore, a fuel tank formed as a hydrogen gas pressure reservoir is preferably equipped with suitable safety and pressure-regulating valves for controlling the pressure in the interior of the fuel tank. In the case of a fuel tank formed as a hydrogen gas pressure reservoir, it is possible to utilize the fact that an aircraft outer skin normally has an aerodynamically favourable rounded shape which is also suitable for realizing a pressure hull.

The housing element of the fuel cell system module according to the invention which is designed to form a section of the outer skin of the aircraft when the fuel cell system module is connected to the fuselage section of the aircraft can be formed at least partly also by a section of a fuel cell system housing accommodating the peripheral components of the fuel cell system and/or the fuel cell. In principle, all the components of the fuel cell system which are not to be assigned to the fuel tank housing can be accommodated in the fuel cell system housing. In the case of a particularly preferred embodiment of the fuel cell system module according to the invention, one section of the aircraft outer skin is formed by a section of a fuel tank housing and a further section of the aircraft outer skin is formed by a section of a fuel cell system housing, in the interior of which further components of the fuel cell system, such as, for example, peripheral components and/or a fuel cell are arranged.

The fuel cell system module according to the invention can be designed to be integrated into the aircraft structure, for example, in the region of a belly fairing of the aircraft. The housing element of the fuel cell system module then preferably forms a section of the aircraft outer skin in the region of the belly fairing. Alternatively to this, the fuel cell system module can also be formed as a tail boom which is connectable modularly to the fuselage section of the aircraft. An aircraft tail boom constitutes a relatively easily accessible element of the aircraft structure and can therefore be formed particularly simply as a modularly exchangeable component. Finally, an integration of the fuel cell system module according to the invention into a horizontal tail or a vertical tail of an aircraft is conceivable. The housing element of the fuel cell system module is then designed to form a section of the aircraft outer skin in the region of the elevator unit or the rudder unit when the fuel cell system module is integrated into the aircraft structure.

The fuel cell system module according to the invention can comprise a fastening device which is designed to fasten the fuel cell system module releasably to a frame of the aircraft structure. For example, the fastening device of the fuel cell system module can be designed to enable a mounting of the fuel cell system module on a frame of the aircraft structure, which frame is arranged in the tail region of the aircraft.

In the airline business, an aeroplane type will often operate with very different missions. Particularly short- and medium-range aeroplanes are often employed for a lot of short routes, i.e. routes which are significantly below the maximum range of the aeroplanes, and only a few routes which are in the region of the maximum range of the aeroplanes. Depending on the mission profile of an aeroplane, therefore, the amount of hydrogen required on board the aeroplane for operating a fuel cell system during the airline operation of the aeroplane may possibly vary greatly. Moreover, it is not possible to refuel with hydrogen at all airports. On account of this, during the airline operation of an aeroplane, the capacity of a fuel tank for supplying a fuel cell system provided on board the aeroplane may be subject to very different requirements.

A set, according to the invention, of fuel cell system modules for use in an aircraft therefore comprises a plurality of above-described fuel cell system modules which are equipped with fuel tanks of different capacity. In other words, in the fuel cell system module set according to the invention, a first fuel cell system module comprises a fuel tank with a certain capacity. A further fuel cell system module or further fuel cell system modules of the fuel cell system module set according to the invention comprises/comprise, in contrast, a fuel tank with a capacity differing from the capacity of the fuel tank of the first fuel cell system module. For example, in a fuel cell system module set according to the invention, a first fuel cell system module may comprise a fuel tank with a capacity of 500 liters, while a second fuel cell system module comprises a fuel tank with a capacity of 1000 liters and a third fuel cell system module is equipped with a fuel tank with a capacity of 1500 liters.

When the aircraft is operated on a route which is below its maximum range, a fuel cell system module comprising a fuel tank with a small capacity can be employed. As a result, weight and fuel savings and/or payload capacity increases when the aircraft is in flight can be achieved. In contrast, when the aircraft is operated on routes which are in the region of its maximum range or is flying to destination airports without a hydrogen supply network, the aircraft can be connected modularly to a fuel cell system module comprising a fuel tank with a larger capacity. The fuel cell system module set according to the invention thus enables optimum fuel supply of the fuel cell system provided on board the aircraft in all operating situations of an aircraft, while at the same time allowing particularly efficient operation of the aircraft in flight.

An aircraft according to the invention comprises an above-described fuel cell system module.

BRIEF DESCRIPTION OF THE DRAWINGS

A preferred embodiment of a fuel cell system module according to the invention will now be explained in more detail with reference to the appended schematic figures, of which.

DETAILED DESCRIPTION

Figure 1:
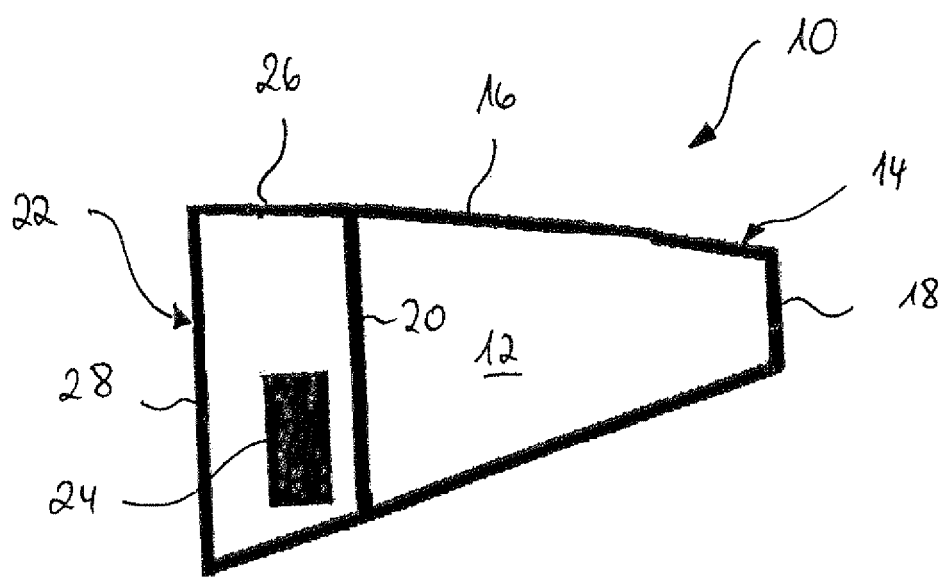
FIG. 1 shows a fuel cell system module formed as an aeroplane tail boom.

A fuel cell system module 10 illustrated in FIG. 1 is formed as an aeroplane tail boom and comprises a fuel tank 12 which is suitable for storing hydrogen gas under elevated pressure. The fuel tank 12 has a fuel tank housing 14 with a lateral surface 16 a tail-side boundary surface 18 and a separating surface 20. The fuel cell system module 10 further comprises a fuel cell system housing 22 which adjoins the fuel tank housing 14 and in which peripheral components and a fuel cell 24 of a fuel cell system are accommodated. The fuel cell system housing 22 comprises a lateral surface 26 and a nose-side boundary surface 28.

Figure 2:
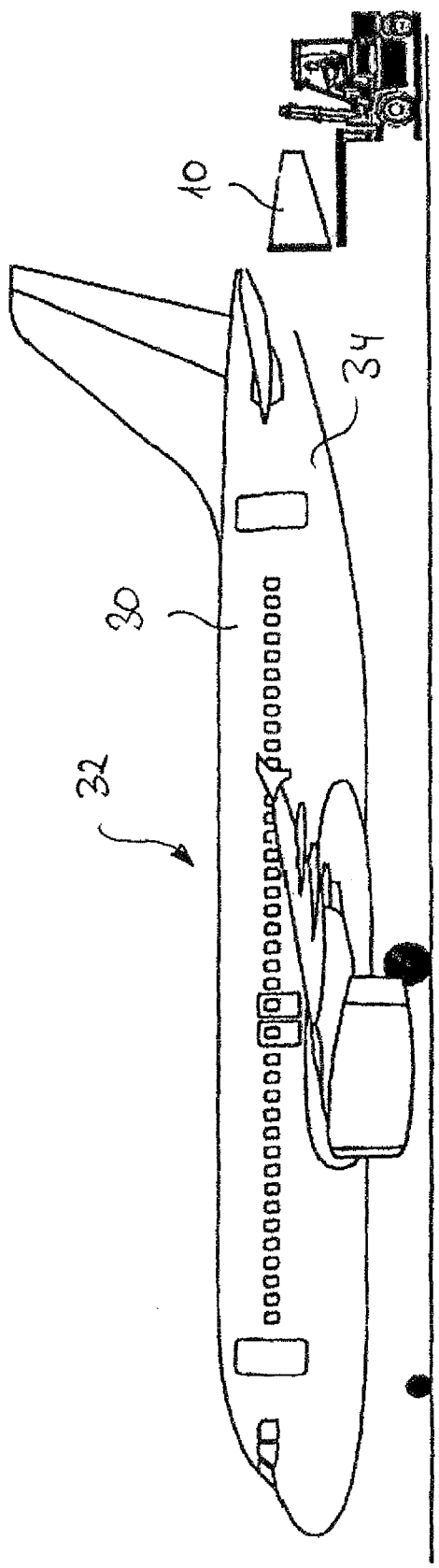
FIG. 2 shows the mounting of the fuel cell system module illustrated in FIG. 1 on an aeroplane.

In the region of the nose-side boundary surface 28 of the fuel cell system housing 22, the fuel cell system module 10 is provided with a fastening device which is designed to connect the fuel cell system module 10, as shown in FIG. 2, modularly to a fuselage section 30 of an aeroplane 32. The fastening device may be formed as a screwed connection device or a riveted connection device, but also as an adhesive-bonded connection device or the like. In particular, the fastening device of the fuel cell system module 10 is designed to fasten the fuel cell system module 10 releasably to a last tail-side frame of a structure of the aeroplane 32.

When the fuel cell system module 10 is connected to the fuselage section 30 of the aeroplane 32, the lateral surface 16 of the fuel tank housing 14 and the lateral surface 26 of the fuel cell system housing 22 form a section of an outer skin 34 of the aeroplane. Consequently, the fuel cell system module 10 can be integrated modularly into the fuselage structure of the aeroplane 32.

A fuel cell system module set (not shown in the figures) comprises a plurality of fuel cell system modules 10. The fuel cell system modules 10 each have a fuel tank 12, however the capacity of the fuel tank 12 of the individual fuel cell system modules 10 differs in each case. According to requirements, a fuel cell system module 10 of the fuel cell system module set whose fuel tank 12 has an optimum capacity for a predetermined mission of the aeroplane 32 can be connected to the fuselage section 30 of the aeroplane 32.

The invention claimed is:

1. A fuel cell system module for use in an aircraft having a fuselage section having an outer skin, the fuel cell system module comprising:
    at least one fuel cell system component, and
    a fuel tank having a fuel tank housing, wherein the fuel tank housing comprises:
        an outer shell,
        an inner shell spaced apart from the outer shell,
        a first space located between the outer shell and the inner shell of the fuel tank housing and being filled with a material of poor thermal conductivity, and
        a second space defined within the inner shell for holding fuel to be supplied to the at least one fuel cell system component,
    wherein the fuel cell system module connects, by a fastening device which is designed to fasten the fuel cell system module releasably to an aircraft structure, modularly to the fuselage section of the aircraft in such a manner that at least a portion of the outer shell forms a partial section of the outer skin of the fuselage section when the fuel cell system module is connected to the fuselage section of the aircraft.

2. The fuel cell system module according to claim 1, further comprising:
    a fuel cell system housing, and
    at least one of peripheral components of the fuel cell system and a fuel cell.

3. The fuel cell system module according to claim 2, wherein the fuel cell system housing and the fuel tank housing are connected along a separating wall such that the fuel cell system housing defines a first partial portion of the outer skin of the fuselage section and the outer shell of the fuel tank housing defines a second partial portion of the outer skin of the fuselage section when the fuel cell system module is connected to the fuselage section of the aircraft.

4. The fuel cell system module according to claim 1, wherein the fuel tank is designed to store hydrogen gas under elevated pressure.

5. The fuel cell system module according to claim 2, wherein the fuel cell system housing is designed to form a section of the outer skin of the fuselage section when the fuel cell system module is connected to the fuselage section of the aircraft, and wherein the fuel cell system housing accommodates the at least one of the peripheral components of the fuel cell system and the fuel cell.

6. The fuel cell system module according to claim 1, wherein the fuel cell system module is formed as a tail boom which is connectable modularly to the fuselage section of the aircraft.

7. A set of fuel cell system modules for use in an aircraft, comprising:
    a plurality of fuel cell system modules according to claim 1, and the plurality of fuel cell system modules being equipped with fuel tanks of different capacities.

8. Use of a fuel cell system module according to claim 1 on an aircraft, comprising:
    connecting the fuel cell system module to a fuselage section of the aircraft with a fastening device such that the fuel cell system module is modular and releasable; and
    forming a section of an outer skin of the aircraft with the outer shell of the fuel tank housing after connecting the fuel cell system module to the fuselage section.

9. The fuel cell system module according to claim 1, wherein the outer shell of the fuel tank housing is composed of a rigid material such that the partial section of the outer skin formed by the outer shell is also composed of a rigid material when the fuel cell system module is connected to the fuselage section of the aircraft.

10. An air travel system, comprising:
    an aircraft having a fuselage section having an outer skin;
    a fuel cell system module releasably connected to the fuselage section to form a tail boom for the aircraft, the fuel cell system module comprising:
        at least one fuel cell system component including a fuel cell system housing and at least one of a fuel cell and peripheral components of the fuel cell system, and
        a fuel tank having a fuel tank housing, wherein the fuel tank housing comprises:
            an outer shell composed of a rigid material,
            an inner shell spaced apart from the outer shell,
            a first space located between the outer shell and the inner shell of the fuel tank housing and being filled with a material of poor thermal conductivity, and
            a second space defined within the inner shell for holding fuel to be supplied to the at least one fuel cell system component,
    wherein the fuel cell system module connects, by a fastening device which is designed to fasten the fuel cell system module releasably to an aircraft structure, modularly to the fuselage section of the aircraft,
    wherein the fuel cell system housing and the fuel tank housing are connected along a separating wall such that the fuel cell system housing defines a first partial portion of the outer skin of the fuselage section and the outer shell of the fuel tank housing defines a second partial portion of the outer skin of the fuselage section when the fuel cell system module is connected to the fuselage section of the aircraft.

* * * * *